(12) United States Patent
Cheng

(10) Patent No.: US 9,327,679 B2
(45) Date of Patent: May 3, 2016

(54) SAFETY BELT BUFFERING DEVICE AND VEHICLE SAFETY SEAT HAVING THE SAFETY BELT BUFFERING DEVICE

(71) Applicant: Chin-Ming Cheng, New Territories (HK)

(72) Inventor: Chin-Ming Cheng, New Territories (HK)

(73) Assignee: Wonderland Nurserygoods Company Limited, Kwai Chung, N.T. (HK)

( * ) Notice: Subject to any disclaimer, the term of this patent is extended or adjusted under 35 U.S.C. 154(b) by 0 days.

(21) Appl. No.: 14/480,649

(22) Filed: Sep. 9, 2014

(65) Prior Publication Data

US 2015/0076875 A1 Mar. 19, 2015

Related U.S. Application Data

(60) Provisional application No. 61/877,299, filed on Sep. 13, 2013.

(51) Int. Cl.
| | |
|---|---|
| *B60N 2/42* | (2006.01) |
| *B60R 22/28* | (2006.01) |
| *B60N 2/28* | (2006.01) |
| *B60N 2/26* | (2006.01) |
| *B60R 22/10* | (2006.01) |

(52) U.S. Cl.
CPC ............. *B60R 22/28* (2013.01); *B60N 2/265* (2013.01); *B60N 2/2812* (2013.01); *B60R 22/105* (2013.01); *B60N 2002/2815* (2013.01); *B60R 2022/286* (2013.01)

(58) Field of Classification Search
CPC .... B60N 2/2884; B60N 2/286; B60N 2/2812; B60N 2/2863; B60N 2/42; B60N 22/28; B60N 21/18; B60N 22/00; B60N 22/105; B60N 2/265; B60N 2022/286

USPC ............. 297/216.11, 482, 484, 470–472
See application file for complete search history.

(56) References Cited

U.S. PATENT DOCUMENTS

| | | | | | |
|---|---|---|---|---|---|
| 3,361,475 | A | * | 1/1968 | Villiers | 297/472 |
| 3,862,673 | A | * | 1/1975 | Benson | 188/268 |
| 4,652,053 | A | * | 3/1987 | Mikami | B60R 22/20 |
| | | | | | 297/483 |
| 4,904,023 | A | * | 2/1990 | Fohl | 297/472 |
| 5,082,325 | A | * | 1/1992 | Sedlack | 297/468 |
| 5,566,978 | A | * | 10/1996 | Fleming | B60R 22/1951 |
| | | | | | 188/377 |

(Continued)

FOREIGN PATENT DOCUMENTS

CN 202806672 U 3/2013

*Primary Examiner* — Beth Stephan
(74) *Attorney, Agent, or Firm* — Winston Hsu; Scott Margo

(57) ABSTRACT

A safety belt buffering device and a related vehicle safety seat are provided. The safety belt buffering device is applied to a shoulder belt. The safety belt buffering device includes a buffering component, a blocking component and an actuating component. The buffering component includes an accommodating space, and the accommodating space is formed through the buffering component. The blocking component is disposed inside the accommodating space. The actuating component is disposed on the shoulder belt. The shoulder belt movably passes through the accommodating space. The actuating component is driven to move into the accommodating space to contact the blocking component when the shoulder belt is pulled by external impact, and the blocking component is structurally deformed to reduce the external impact. The present invention can obviously decrease the impact energy transmitted from the vehicle safety seat to the passenger, so as to protect safety of the passenger.

21 Claims, 8 Drawing Sheets

(56) References Cited

U.S. PATENT DOCUMENTS

| | | | | |
|---|---|---|---|---|
| 5,697,670 A * | 12/1997 | Husted | ................ | B60N 2/4221 297/216.13 |
| 6,513,870 B1 * | 2/2003 | Takizawa | ................ | 297/216.11 |
| 6,517,154 B2 * | 2/2003 | Sawamoto | ................ | 297/216.11 |
| 6,619,752 B1 | 9/2003 | Glover | | |
| 7,048,339 B2 * | 5/2006 | Mei et al. | ................ | 297/470 |
| 7,121,628 B2 * | 10/2006 | Lo | ................ | 297/482 |
| 7,128,374 B2 * | 10/2006 | Mitropoulos | ................ | 297/472 |
| 7,350,734 B2 * | 4/2008 | Stevens | ................ | B60R 22/1955 242/374 |
| 7,350,862 B2 * | 4/2008 | Fransen et al. | ................ | 297/250.1 |
| 7,401,859 B2 * | 7/2008 | Kim et al. | ................ | 297/465 |
| 7,644,986 B2 * | 1/2010 | Berger et al. | ................ | 297/216.11 |
| 7,959,223 B2 * | 6/2011 | Marsden et al. | ................ | 297/216.11 |
| 2002/0043830 A1 * | 4/2002 | Sawamoto | ................ | 297/216.11 |
| 2004/0095004 A1 * | 5/2004 | Horton et al. | ................ | 297/250.1 |
| 2006/0071535 A1 * | 4/2006 | Kim et al. | ................ | 297/465 |
| 2007/0057544 A1 * | 3/2007 | Nakhla et al. | ................ | 297/250.1 |
| 2007/0210639 A1 * | 9/2007 | Berger et al. | ................ | 297/470 |
| 2008/0012401 A1 * | 1/2008 | Amesar et al. | ................ | 297/216.11 |
| 2008/0136224 A1 * | 6/2008 | Malapati et al. | ................ | 297/216.11 |
| 2008/0303325 A1 * | 12/2008 | Scholz | ................ | 297/250.1 |
| 2009/0026815 A1 * | 1/2009 | Amesar et al. | ................ | 297/216.11 |
| 2010/0026064 A1 * | 2/2010 | Marsden et al. | ................ | 297/250.1 |
| 2012/0205960 A1 * | 8/2012 | Finch | ................ | 297/470 |
| 2013/0169013 A1 * | 7/2013 | Carine | ................ | 297/254 |

* cited by examiner

SAFETY BELT BUFFERING DEVICE AND VEHICLE SAFETY SEAT HAVING THE SAFETY BELT BUFFERING DEVICE

CROSS REFERENCE TO RELATED APPLICATIONS

This application claims the benefit of U.S. provisional application No. 61/877,299, filed on Sep. 13, 2013. The entire contents of these related applications are incorporated herein by reference.

BACKGROUND OF THE INVENTION

1. Field of the Invention

The present invention relates to a safety belt buffering device and a vehicle safety seat having the safety belt buffering device, and more particularly, to a safety belt buffering device capable of reducing impact energy and a vehicle safety seat having the foresaid safety belt buffering device.

2. Description of the Prior Art

A conventional vehicle seat includes a safety belt device, which can tie down the passenger to constrain a movement of the passenger and to reduce impact applied to the passenger for protection when the vehicle speeds up and slows down. Generally, a young child or a baby is not suitable for the current safety device except a child safety seat with specific design. The conventional child safety seat is installed on the vehicle seat, and utilizes a housing to shelter the child and/or the baby for safety protection. However, the conventional child safety seat cannot absorb or reduce the impact transmission. The impact may be transmitted to the baby from the housing and results in hurt since the impact applied to the child safety seat is larger than tolerance.

SUMMARY OF THE INVENTION

The present invention provides a safety belt buffering device capable of reducing impact energy and a vehicle safety seat having the foresaid safety belt buffering device for solving above drawbacks.

According to the claimed invention, the safety belt buffering device is applied to a shoulder belt. The safety belt buffering device includes a buffering component, a blocking component and an actuating component. The buffering component includes an accommodating space, and the accommodating space is formed through the buffering component. The blocking component is disposed inside the accommodating space. The actuating component is disposed on the shoulder belt. The shoulder belt movably passes through the accommodating space. The actuating component is driven to move into the accommodating space to contact the blocking component when the shoulder belt is pulled by external impact, and the blocking component is structurally deformed to reduce the external impact.

According to the claimed invention, the buffering component further includes two openings respectively communicating with opposite sides of the accommodating space, and the shoulder belt movably passes through the accommodating space via the two openings. The actuating component moves into the accommodating space via one of the two openings on the buffering component. A part of the shoulder belt is located between the blocking component and an inner wall of the buffering component. The actuating component includes two slots adjacent to each other, and the shoulder belt inserts into the two slots to assemble with the actuating component.

According to the claimed invention, the accommodating space includes two lateral walls opposite to each other. The blocking component includes a protruding structure disposed on one of the two lateral walls, and a distance between a front end of the blocking component and the other lateral wall is substantially smaller than a width of the actuating component. Further, the safety belt buffering device includes a plurality of blocking components disposed inside the accommodating space and arranged along a moving direction of the actuating component relative to the buffering component. The plurality of blocking component respectively includes protruding structures disposed on opposite lateral walls of the accommodating space, and a distance between front ends of the corresponding blocking components respectively disposed on the opposite lateral walls is substantially smaller than a width of the actuating component. Further, the blocking component includes a linear structure or a non-linear structure, or includes a rod structure, a waveform structure or a honeycombed structure.

According to the claimed invention, the vehicle safety seat has a shoulder belt. The vehicle safety seat includes a seat and a safety belt buffering device. A shoulder belt hole is formed on the seat, and an end of the shoulder belt movably passes through the shoulder belt hole. The safety belt buffering device includes a buffering component, a blocking component and an actuating component. The buffering component is disposed on the seat and includes an accommodating space, and the accommodating space is formed through the buffering component. The blocking component is disposed inside the accommodating space. The actuating component is disposed on the shoulder belt. The other end of the shoulder belt is connected to the seat. The shoulder belt movably passes through the accommodating space to assemble with the actuating component. The actuating component is driven to move into the accommodating space to contact the blocking component when the shoulder belt is pulled by external impact, and the blocking component is structurally deformed to reduce the external impact.

According to the claimed invention, the vehicle safety seat further includes a connecting component and a crotch belt. Two ends of the crotch belt are respectively connected to the seat and connecting component. The shoulder belt is connected to the seat via the connecting component and the crotch belt. The vehicle safety seat further includes a backrest, and the buffering component is disposed on a back of the backrest.

The safety belt buffering device of the present invention is preferably applied to the vehicle child safety seat. The safety belt buffering device disposes one or more blocking components inside the accommodating space on the buffering component, and the shoulder belt threads through the buffering component and the actuating component. The actuating component is disposed adjacent to the buffering component. Structure, material and amount of the blocking component are not limited to the above-mentioned embodiment, and depend on design demand. The blocking component is made of structurally deformable material or structurally fractured material, and is utilized to absorb the external impact from the actuating component when the actuating component moves into the buffering component, so as to constrain the relative movement between the actuating component and the buffering component. The shoulder belt can comfortably tie down the passenger to provide preferred safety protection. Due to destructible property of the blocking component, the buffering component can be disassembled for easy replacement. The buffering component is replaced according to spoilage degree of the blocking component, to ensure that the safety belt buffering device can supply stable and effective safety protection function. Comparing to the prior art, the safety belt buffering device of the present invention utilizes the blocking component to reduce the movement of the actuating component relative to the buffering component, the impact energy transmitted from the vehicle safety seat to the passenger can be obviously decreased, so that the vehicle safety seat having the safety belt buffering device of the present invention can protect safety of the passenger.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
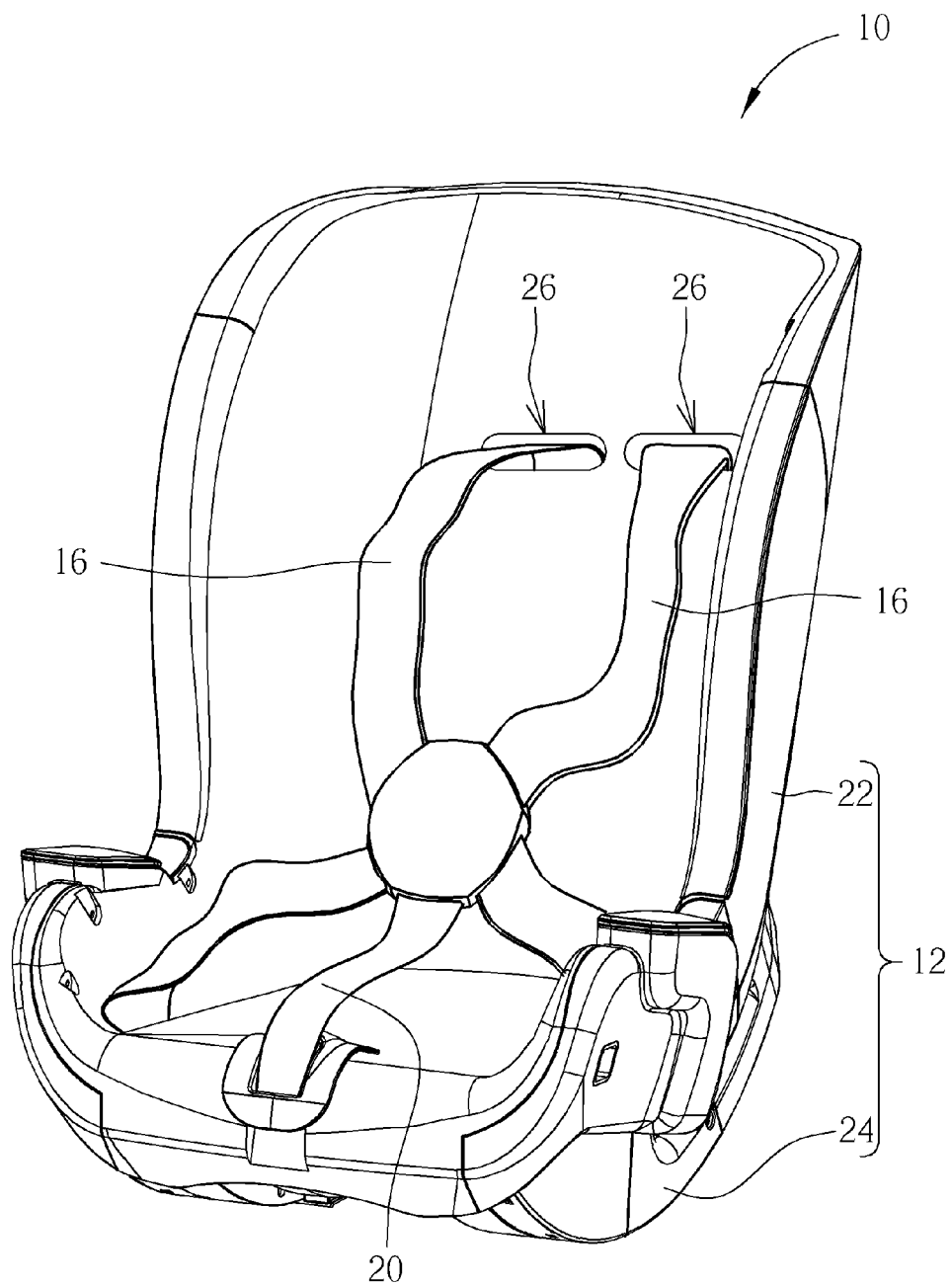
FIG. 1 and FIG. 2 respectively are diagrams of a vehicle safety seat in different views according to an embodiment of the present invention.
Figure 2:
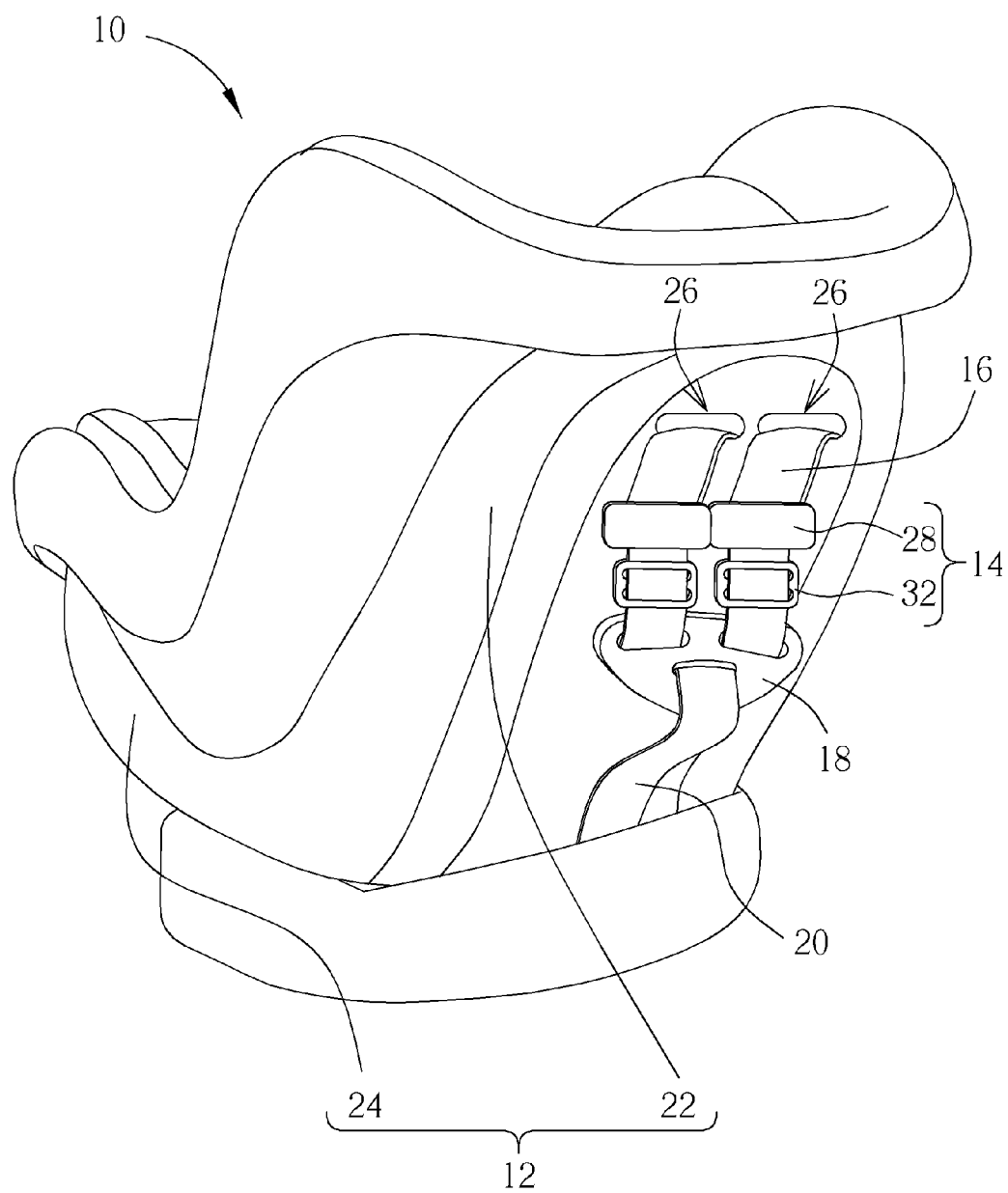
Figure 3:
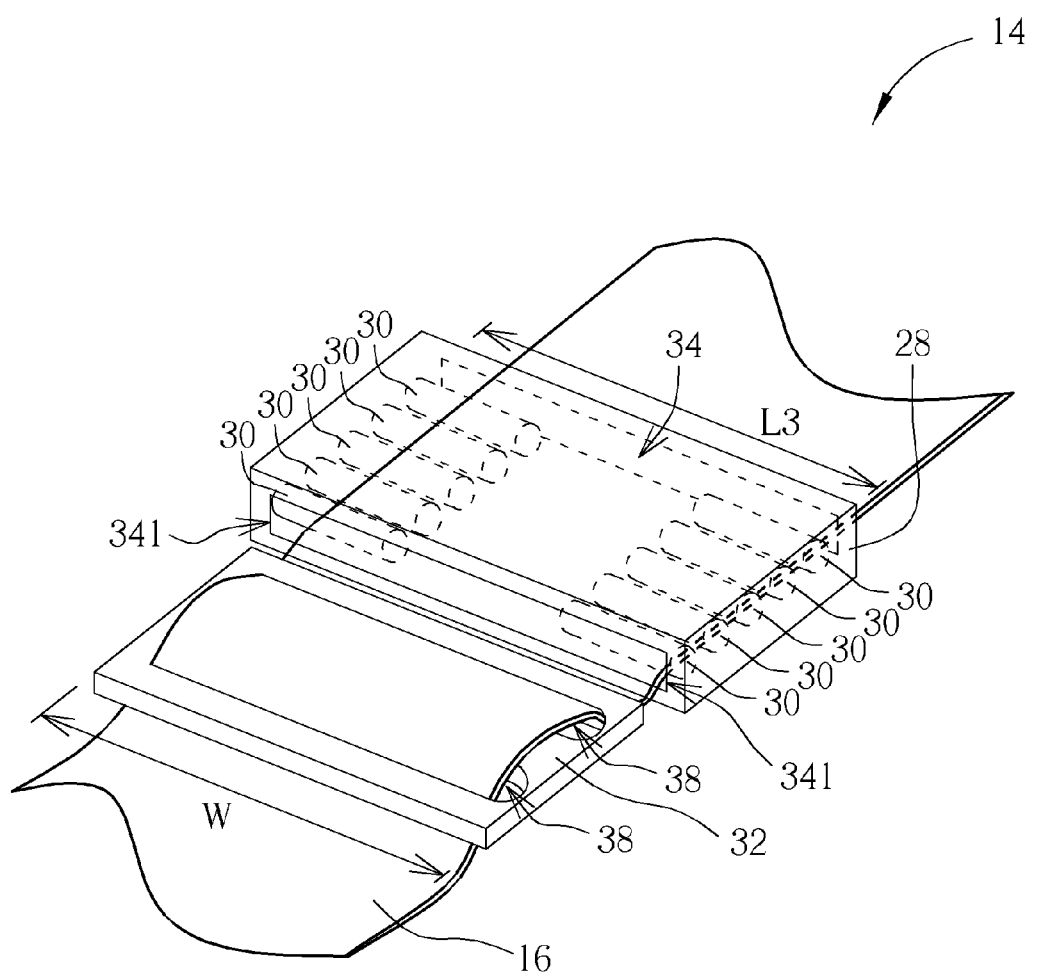
FIG. 3 is a diagram of a safety belt buffering device according to the embodiment of the present invention.
Figure 4:
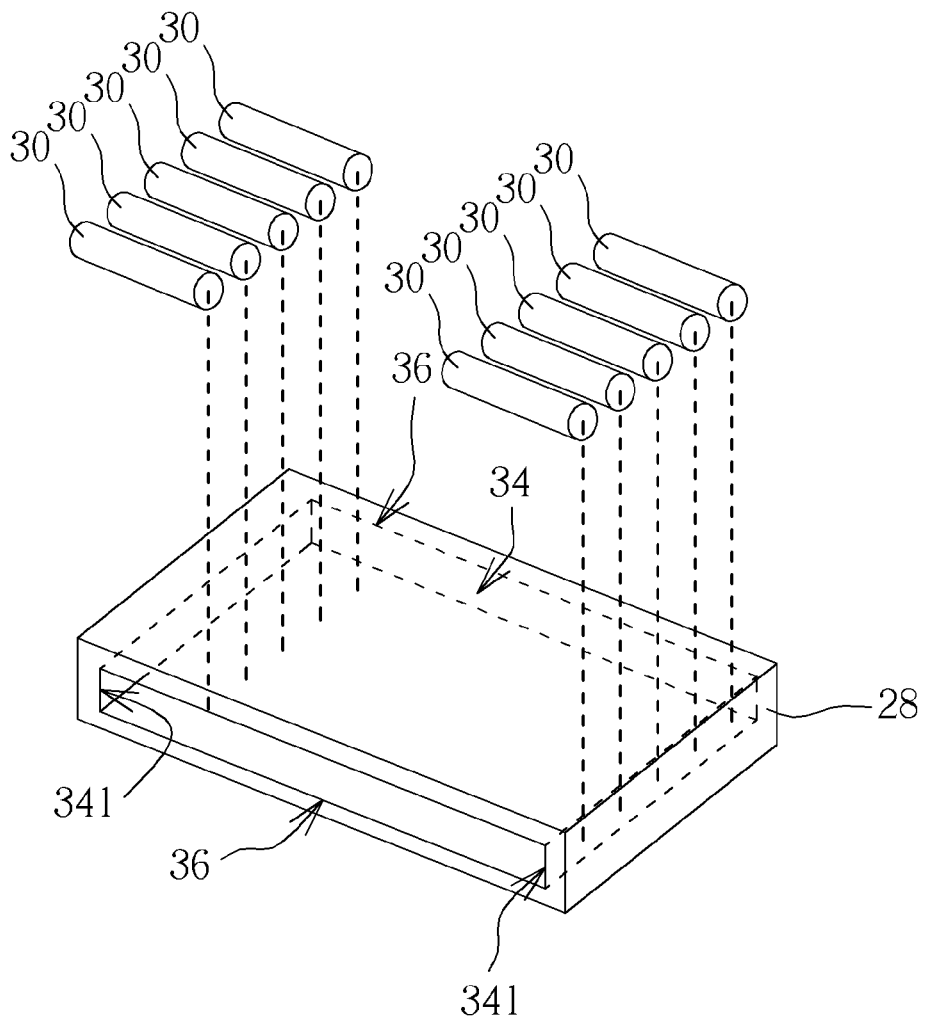
FIG. 4 is a diagram of a buffering component according to the embodiment of the present invention.

Please refer to FIG. 1 to FIG. 4. FIG. 1 and FIG. 2 respectively are diagrams of a vehicle safety seat 10 indifferent views according to an embodiment of the present invention. FIG. 3 is a diagram of a safety belt buffering device 14 according to the embodiment of the present invention. FIG. 4 is a diagram of a buffering component 28 according to the embodiment of the present invention. The vehicle safety seat 10 includes a seat 12, the safety belt buffering device 14, a shoulder belt 16, a connecting component 18 and a crotch belt 20. The shoulder belt 16 and the crotch belt 20 are safety belts for protection of the passenger. The seat 12 includes a backrest 22 and a seat body 24, and a shoulder belt hole 26 is formed on the backrest 22. An amount of the shoulder belt hole 26 is varied according to body side of the passenger (such as a child or a baby). An end of the crotch belt 20 is connected to the connecting component 18, and the other end of the crotch belt 20 is disposed on the seat body 24 of the seat 12. An end of the shoulder belt 16 movably passes through the shoulder belt hole 26, and the other end of the shoulder belt 16 is connected to the connecting component 18, so the shoulder belt 16 can be connected with the seat body 24 via the connecting component 18 and the crotch belt 20. When the passenger sits the vehicle safety seat 10, the shoulder belt 16 may press a shoulder of the passenger to prevent the passenger from forward toppling relative the backrest 22, and the crotch belt 20 is disposed under a crotch of the passenger to prevent the passenger from sliding relative to the seat body 24.

The safety belt buffering device 14 includes the buffering component 28, a blocking component 30 and an actuating component 32. The buffering component 28 is disposed on a back of the backrest 22 of the seat 12. The buffering component 28 includes an accommodating space 34 and two openings 36. The two openings 36 respectively communicate with opposite sides of the accommodating space 34, which means the accommodating space 34 is formed through the buffering component 28. Further, the blocking component 30 is disposed on a lateral wall 341 inside the accommodating space 34. The shoulder belt 16 can movably pass through the accommodating space 34 to assemble with the actuating component 32. When the shoulder belt 16 is pulled, the shoulder belt 16 does not move relative to the actuating component 32 by ordinary but moves relative to the buffering component 28 to contact the actuating component 32 against the blocking component 30, so as to actuate buffering function of the safety belt buffering device 14. As shown in FIG. 3, a width W of the actuating component 32 is preferably smaller than a distance L3 (such as dimension of the opening 36) between the two opposite lateral walls 341.

Figure 5:
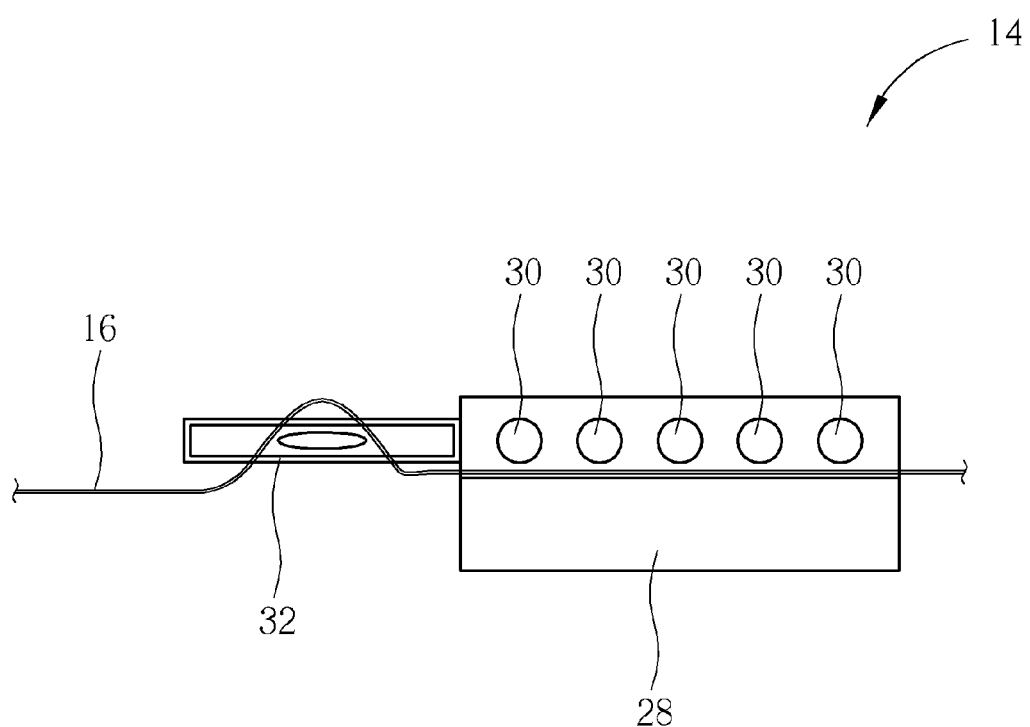
FIG. 5 is a lateral view of the safety belt buffering device according to the embodiment of the present invention.

Please refer to FIG. 1 to FIG. 5. FIG. 5 is a lateral view of the safety belt buffering device 14 according to the embodiment of the present invention. The shoulder belt 16 passes through the two openings 36 to be movably disposed inside the accommodating space 34, and a part of the shoulder belt 16 is located between the blocking component 30 and an inner wall of the buffering component 28, as shown in FIG. 3. The shoulder belt 16 does not contact the blocking component to avoid structural interference when passing through the accommodating space 34. The shoulder belt 16 further passes through two slots 38 adjacent formed on the actuating component 32 to assemble with the actuating component 32, as shown in FIG. 3. Therefore, the actuating component 32 is disposed on the shoulder belt 16. The actuating component 32 is movably located by a side of the buffering component 28 and aligns with one of the openings 36. The actuating component 32 is driven to move relative to the buffering component 28 when the shoulder belt 16 is pulled close to the buffering component 28. Since the vehicle whereon the vehicle safety seat 10 is disposed slows down in sudden, the shoulder belt 16 is pulled as a result of external impact, the shoulder belt 16 moves relative to the buffering component 28 because of an inertia force of the passenger, the shoulder belt 16 drives the actuating component 32 to move into the accommodating space 34 via one of openings 36 to contact the blocking component 30. The blocking component 30 is made of structurally deformable material. When the actuating component 32 moves into the accommodating space 34 and contacts against the blocking component 30, impact energy (the external impact) is transmitted from the actuating component 32 to the blocking component 30 to result in structural deformation of the blocking component 30, the impact energy is absorbed by the blocking component 30 so as to decrease a relative movement between the actuating component 32 and the buffering component 28 and to reduce the impact energy, and the safety belt buffering device 14 can effectively protect the passenger from hurt by the external impact.

For example, the blocking component 30 can be made of hard plastic material, and the blocking component 30 is damaged or fractured since the actuating component 32 hits the blocking component 30, so as to absorb the impact energy from the actuating component 32. Further, the blocking component 30 can be made of soft plastic material, and the blocking component 30 is structurally deformed to absorb the external impact transmitted from the actuating component 32. Material and strength selection of the blocking component 30 are designed according to application of the vehicle safety seat 10. As the vehicle safety seat 10 is applied to the child, the material of the blocking component 30 is stronger and the amount of the blocking component 30 is less, or the safety belt buffering device 14 includes fewer buffering components 28 disposed on the backrest 22. As the vehicle safety seat 10 is applied to a baby, the safety belt buffering device 14 includes more buffering components 28 disposed on the backrest 22, and each of the buffering components 28 is assembled with plenty of the blocking components 30 with weaker strength, to prevent the baby from violent impact.

Preferably, the buffering component 28 is detachably disposed on the back of the backrest 22 of the seat 12. The blocking component 30 disposed inside the buffering component 28 can be disassembled and replaced when the safety belt buffering device 14 is operated in a vehicle accident and results in destruction of the blocking component 30.

Figure 6:
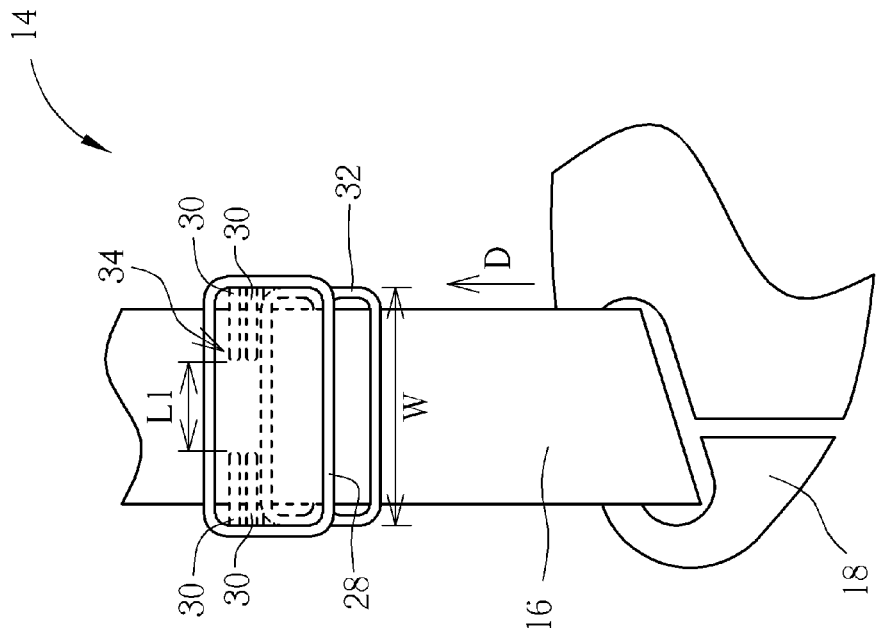
FIG. 6 and FIG. 7 respectively are diagrams of the safety belt buffering device in different operational modes according to the embodiment of the present invention.
Figure 7:
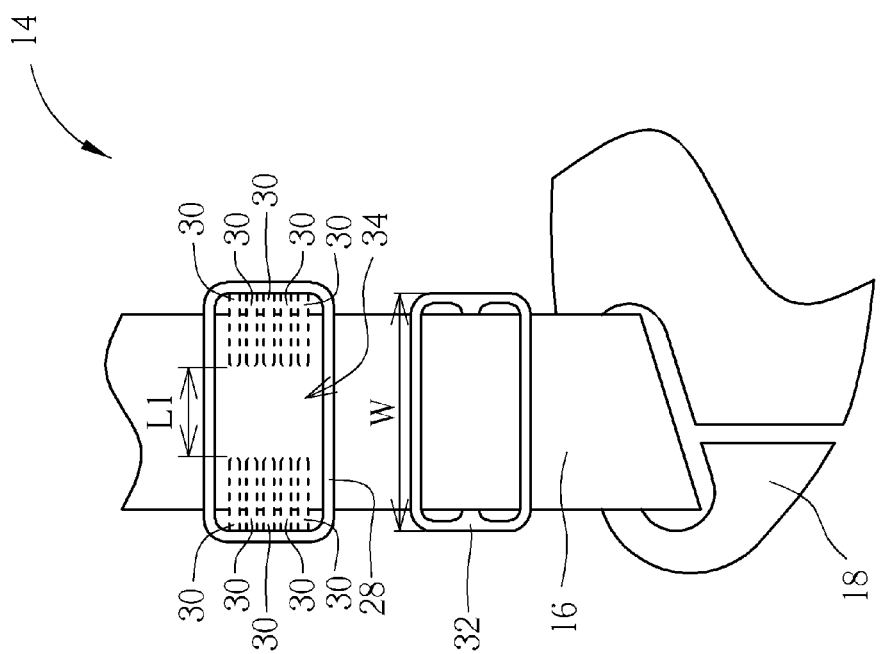

Please refer to FIG. 6 and FIG. 7. FIG. 6 and FIG. 7 respectively are diagrams of the safety belt buffering device 14 in different operational modes according to the embodiment of the present invention. As shown in FIG. 6, the actuating component 32 is separated from the buffering component 28, and the vehicle safety seat 10 is in normal use. As shown in FIG. 7, the vehicle safety seat 10 is impacted, the shoulder belt 16 is pulled by the inertia force of the passenger, and the shoulder belt 16 moves the actuating component 32 into the accommodating space 34 on the buffering component 28 to contact against the blocking component 30. The blocking component 30 may stop a movement of the actuating component without deformation or destruction since the external impact is small. when the external impact is larger than tolerance, the blocking component 30 is structurally deformed or fractured (which corresponds to material of the blocking component 30) since the actuating component 32 hits the blocking component 30, the external impact is transmitted from the actuating component 32 to the blocking component 30 and is absorbed by deformation or destruction of the blocking component 30, so as to slow down a moving speed of the actuating component 32 or to stop a movement of the actuating component 32. In a preferred embodiment, the actuating component 32 is engaged inside the buffering component 28 to constrain pull of the shoulder belt 16, which can avoid the passenger from leaving from the vehicle safety seat 10.

In the foresaid embodiment shown in FIG. 6 and FIG. 7, the safety belt buffering device 14 includes a plurality of blocking components 30. Each of the blocking components 30 includes a protruding structure, such as a shaft form, a spherical form, a polygon form and so on. The plurality of blocking components 30 is disposed on the opposite lateral walls 341 of the accommodating space 34 and arranged along a moving direction D of the actuating component 32 relative to the buffering component 28. In addition, a distance L1 between front ends of two corresponding blocking components 30 respectively disposed on the opposite lateral walls 341 is substantially smaller than the width W of the actuating component 32, so that the actuating component 32 contacts against the blocking component 30 when moving into the accommodating space 34 for the buffering and shake-absorbing function.

Figure 8:
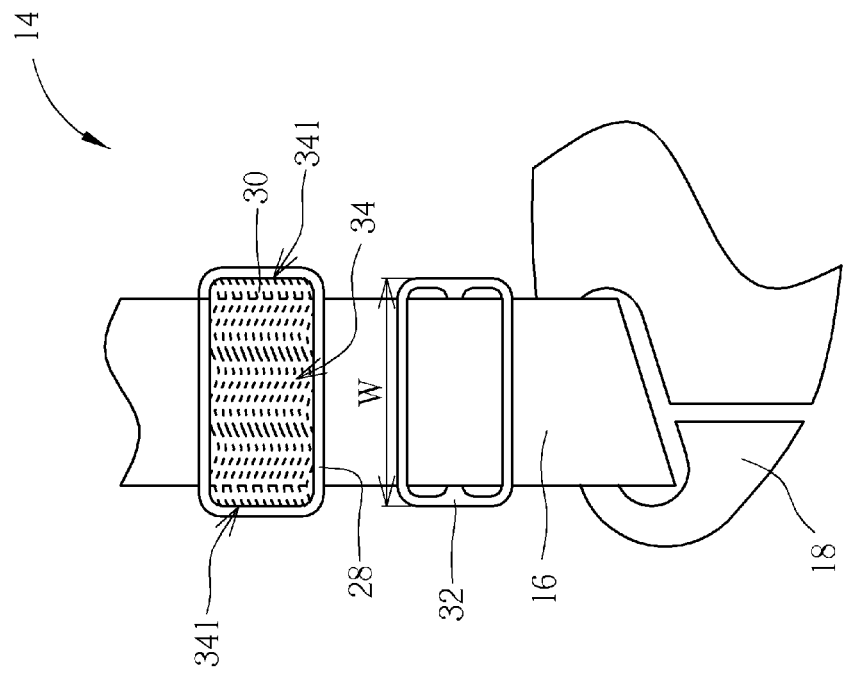
FIG. 8 to FIG. 10 respectively are diagrams of the safety belt buffering device according to different embodiments of the present invention.
Figure 9:
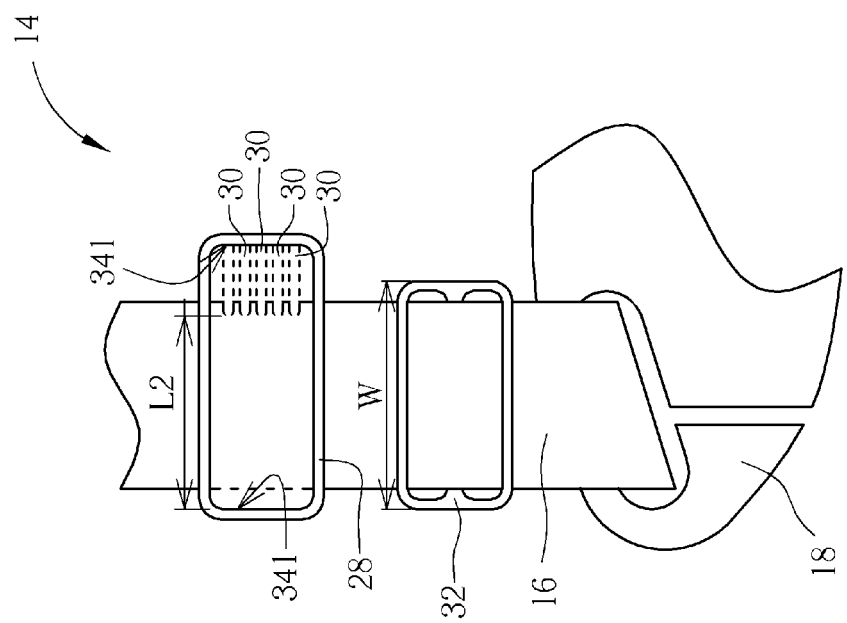
Figure 10:
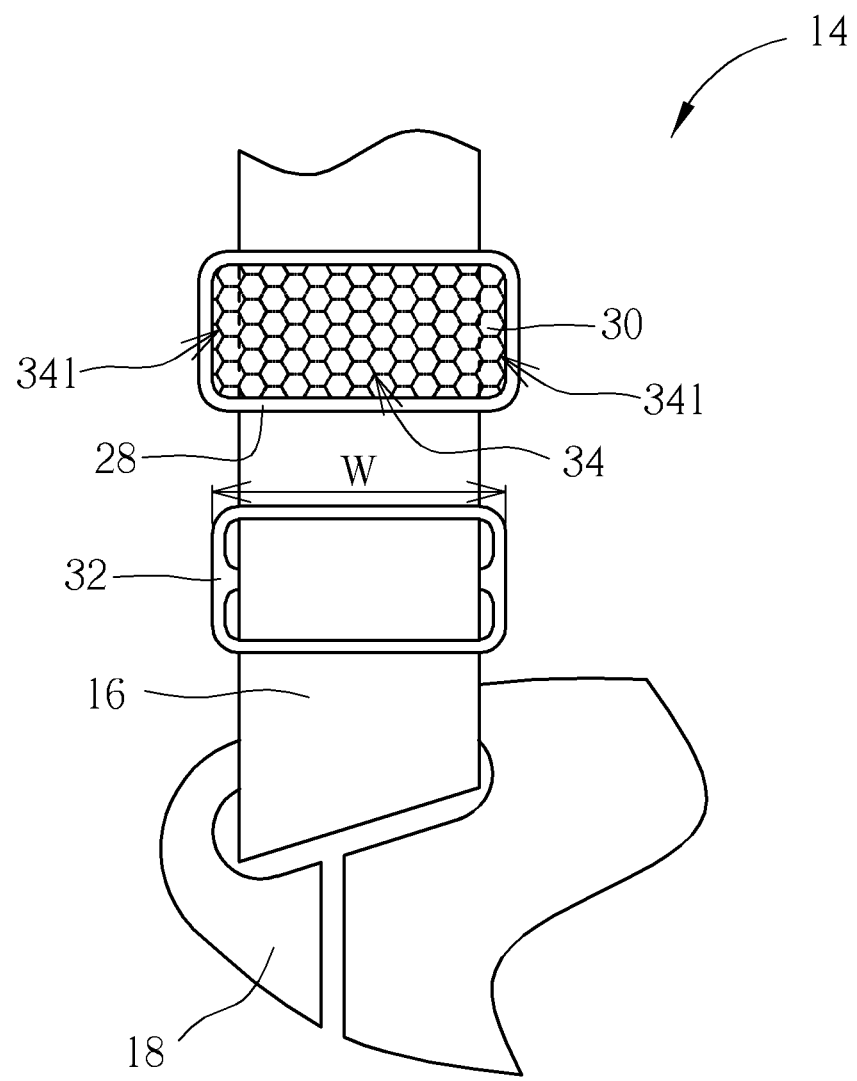

Please refer to FIG. 8 to FIG. 10. FIG. 8 to FIG. 10 respectively are diagrams of the safety belt buffering device 14 according to different embodiments of the present invention. The blocking component 30 shown in FIG. 8 can be the protruding structure with any form and any material, and an end of the blocking component 30 is disposed on the lateral wall 341 of the accommodating space 34. It is to say, the blocking component 30 is disposed on one of the lateral walls 341 (such as the right lateral wall) of the accommodating space 34, and a distance L2 between the front end of the blocking component 30 and the opposite lateral wall 341 (such as the left lateral wall without the blocking component 30) is smaller than the width W of the actuating component 32. The blocking component 30 shown in FIG. 9 can includes a linear structure (such as a rod structure) or a non-linear structure (such as a waveform structure), and two ends of the blocking component 30 are respectively connected to the opposite lateral walls 341 of the accommodating space 34. The blocking component 30 shown in FIG. 10 can be composed of plenty of polygon structures (such as a honeycombed structure or any other structures), the ends of the blocking component 30 are respectively connected to the opposite lateral walls 341 of the accommodating space 34, and the blocking component 30 integrated with the polygon structures is full of the accommodating space 34.

The safety belt buffering device of the present invention is preferably applied to the vehicle child safety seat. The safety belt buffering device disposes one or more blocking components inside the accommodating space on the buffering component, and the shoulder belt threads through the buffering component and the actuating component. The actuating component is disposed adjacent to the buffering component. The blocking component includes the rod structure, the waveform structure or the honeycombed structure. Structure, material and amount of the blocking component are not limited to the above-mentioned embodiment, and depend on design demand. The blocking component is made of structurally deformable material or structurally fractured material, and is utilized to absorb the external impact from the actuating component when the actuating component moves into the buffering component, so as to constrain the relative movement between the actuating component and the buffering component. The shoulder belt can comfortably tie down the passenger to provide preferred safety protection. Due to destructible property of the blocking component, the buffering component can be disassembled for easy replacement. The buffering component is replaced according to spoilage degree of the blocking component, to ensure that the safety belt buffering device can supply stable and effective safety protection function.

Comparing to the prior art, the safety belt buffering device of the present invention utilizes the blocking component to reduce the movement of the actuating component relative to the buffering component, the impact energy transmitted from the vehicle safety seat to the passenger can be obviously decreased, so that the vehicle safety seat having the safety belt buffering device of the present invention can protect safety of the passenger.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A safety belt buffering device applied to a shoulder belt, the safety belt buffering device comprising:
   a buffering component comprising an accommodating space, the accommodating space being formed through the buffering component;
   a blocking component disposed inside the accommodating space; and
   an actuating component disposed on the shoulder belt;
   wherein the shoulder belt movably passes through the accommodating space, the actuating component is driven to move into the accommodating space to contact the blocking component when the shoulder belt is pulled by an external impact, the blocking component is structurally deformed to reduce the external impact, the buffering component further comprises two openings respectively communicating with opposite sides of the accommodating space, and the shoulder belt movably passes through the accommodating space via the two openings.

2. The safety belt buffering device of claim 1, wherein the actuating component moves into the accommodating space via one of the two openings on the buffering component.

3. The safety belt buffering device of claim 1, wherein a part of the shoulder belt is located between the blocking component and an inner wall of the buffering component.

4. The safety belt buffering device of claim 1, wherein the actuating component comprises two slots adjacent to each other, the shoulder belt inserts into the two slots to assemble with the actuating component.

5. The safety belt buffering device of claim 1, wherein the accommodating space comprises two lateral walls opposite to each other, the blocking component comprises a protruding structure disposed on one of the two lateral walls, a distance between a front end of the blocking component and the other lateral wall is substantially smaller than a width of the actuating component.

6. The safety belt buffering device of claim 1, wherein the safety belt buffering device further comprises a plurality of blocking components disposed inside the accommodating space and arranged along a moving direction of the actuating component relative to the buffering component.

7. The safety belt buffering device of claim 6, wherein the plurality of blocking components respectively comprises protruding structures disposed on opposite lateral walls of the accommodating space, a distance between front ends of the corresponding blocking components respectively disposed on the opposite lateral walls is substantially smaller than a width of the actuating component.

8. The safety belt buffering device of claim 1, wherein the blocking component comprises a linear structure or a non-linear structure.

9. The safety belt buffering device of claim 8, wherein the blocking component comprises a rod structure, a waveform structure or a honeycombed structure.

10. A vehicle safety seat with a shoulder belt, the vehicle safety seat comprising:
 a seat whereon a shoulder belt hole is formed, a first end of the shoulder belt movably passing through the shoulder belt hole; and
 a safety belt buffering device, comprising:
  a buffering component disposed on the seat, the buffering component comprising an accommodating space, and the accommodating space being formed through the buffering component;
  a blocking component disposed inside the accommodating space; and
  an actuating component disposed on the shoulder belt;
  wherein a second end of the shoulder belt located opposite to the first end of the shoulder belt is connected to the seat, the shoulder belt movably passes through the accommodating space to assemble with the actuating component, the actuating component is driven to move into the accommodating space to contact the blocking component when the shoulder belt is pulled by an external impact, and the blocking component is structurally deformed to reduce the external impact.

11. The vehicle safety seat of claim 10, further comprising:
 a connecting component and a crotch belt, two ends of the crotch belt being respectively connected to the seat and connecting component, the shoulder belt being connected to the seat via the connecting component and the crotch belt.

12. The vehicle safety seat of claim 10, wherein the seat comprises a backrest, and the buffering component being disposed on a back of the backrest.

13. The vehicle safety seat of claim 10, wherein the buffering component further comprises two openings respectively communicating with opposite sides of the accommodating space, the shoulder belt movably passes through the accommodating space via the two openings.

14. The vehicle safety seat of claim 13, wherein the actuating component moves into the accommodating space via one of the two openings on the buffering component.

15. The vehicle safety seat of claim 10, wherein a part of the shoulder belt is located between the blocking component and an inner wall of the buffering component.

16. The vehicle safety seat of claim 10, wherein the actuating component comprises two slots adjacent to each other, the shoulder belt inserts into the two slots to assemble with the actuating component.

17. The vehicle safety seat of claim 10, wherein the accommodating space comprises two lateral walls opposite to each other, the blocking component comprises a protruding structure disposed on one of the two lateral walls, a distance between a front end of the blocking component and the other lateral wall is substantially smaller than a width of the actuating component.

18. The vehicle safety seat of claim 10, wherein the safety belt buffering device further comprises a plurality of blocking components disposed inside the accommodating space and arranged along a moving direction of the actuating component relative to the buffering component.

19. The vehicle safety seat of claim 18, wherein the plurality of blocking components respectively comprises protruding structures disposed on opposite lateral walls of the accommodating space, a distance between front ends of the corresponding blocking components respectively disposed on the opposite lateral walls is substantially smaller than a width of the actuating component.

20. The vehicle safety seat of claim 10, wherein the blocking component comprises a linear structure or a non-linear structure.

21. The vehicle safety seat of claim 12, wherein the buffering component is detachably disposed on the backrest.

\* \* \* \* \*